United States Patent
Park

(10) Patent No.: US 9,584,973 B2
(45) Date of Patent: Feb. 28, 2017

(54) INTEGRATED POSITIONING METHOD AND APPARATUS

(71) Applicant: ELECTRONICS AND TELECOMMUNICATIONS RESEARCH INSTITUTE, Daejeon (KR)

(72) Inventor: Manho Park, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 14/669,070

(22) Filed: Mar. 26, 2015

(65) Prior Publication Data

US 2015/0289101 A1    Oct. 8, 2015

(30) Foreign Application Priority Data

Apr. 3, 2014    (KR) .......................... 10-2014-0040211

(51) Int. Cl.
  *H04W 24/00*    (2009.01)
  *H04W 4/02*    (2009.01)
(52) U.S. Cl.
  CPC .................... *H04W 4/023* (2013.01)
(58) Field of Classification Search
  None
  See application file for complete search history.

(56) References Cited

U.S. PATENT DOCUMENTS

| | | | |
|---|---|---|---|
| 2005/0143916 A1 | 6/2005 | Kim et al. | |
| 2011/0074632 A1 | 3/2011 | Yeo et al. | |
| 2011/0080317 A1* | 4/2011 | Alizadeh-Shabdiz | G01S 19/40 342/357.23 |
| 2012/0112958 A1 | 5/2012 | Alizadeh-Shabdiz et al. | |
| 2012/0203451 A1 | 8/2012 | Kim et al. | |
| 2013/0337834 A1* | 12/2013 | Alpert | H04W 4/008 455/456.1 |
| 2014/0335887 A1* | 11/2014 | Liu | G01S 19/00 455/456.1 |

FOREIGN PATENT DOCUMENTS

| | | |
|---|---|---|
| KR | 10-2005-0066544 A | 6/2005 |
| KR | 10-2011-0035983 A | 4/2011 |
| KR | 10-2012-0091588 A | 8/2012 |
| KR | 10-2013-0001383 A | 1/2013 |

* cited by examiner

*Primary Examiner* — Erika Washington
(74) *Attorney, Agent, or Firm* — Rabin & Berdo, P.C.

(57) ABSTRACT

An integrated positioning apparatus acquires a first estimated position obtained by a first positioning scheme and a first weight for the first estimated position. The integrated positioning apparatus acquires a second estimated position obtained by a second positioning scheme and a second weight for the second estimated position. The integrated positioning apparatus corrects the first and second weights based on reference position information corresponding to position environment of a user. The integrated positioning apparatus integrates the first and second estimated positions to produce a third estimated position by using the corrected first and second weights.

17 Claims, 5 Drawing Sheets

INTEGRATED POSITIONING METHOD AND APPARATUS

CROSS-REFERENCE TO RELATED APPLICATION

This application claims priority to and the benefit of Korean Patent Application No. 10-2014-0040211 filed in the Korean Intellectual Property Office on Apr. 3, 2014, the entire contents of which are incorporated herein by reference.

BACKGROUND OF THE INVENTION (a) Field of the Invention

The present invention relates to a method and apparatus for measuring a user's location. More particularly, the present invention relates to an integrated positioning method and apparatus which measure a user's location by integrating positioning results obtained through different positioning schemes.

(b) Description of the Related Art

In recent years, personal handheld terminals capable of providing position information have been spreading rapidly. Moreover, services for providing position information and geographical information via portable terminals are growing rapidly. At present, positioning services used to provide position information include a GNSS (Global Navigation Satellite System) service using a navigation satellite system such as the GPS (Global Positioning System) and a WPS (WiFi Positioning System) service using WiFi APs (access points).

The GNSS service is one of the most popular positioning services today, and provides relatively high reliability and high accuracy in an environment such as an open area where navigation signals are properly received from navigation satellites in orbit. However, due to the characteristics of the GNSS service, GNSS signals may not be received properly or may not be received at all in environments such as in indoor areas, underground areas, or alleys between buildings. Due to this, the GNSS service is poor in positioning quality or the service itself is limited. That is, in urban areas to which the GNSS service is mainly targeted, the closer a user is to a building, the more severe effects signal diffraction, reflection, blocking, etc. have. Thus, positioning errors increase and positioning reliability decreases with this increase. This is the biggest disadvantage of the GNSS service.

The WPS service is a method of estimating location using APs in a WLAN (wireless local area network). In the WPS service, usually, a positioning terminal measures the strengths of signals received from APs and calculates signal transmission distances according to signal attenuation. Then, the positioning terminal estimates location using the calculated values. Alternatively, the positioning terminal estimates location using a list of APs found at a point of measurement, based on proximity positioning.

The WPS service is efficient in urban areas or indoor areas where APs are densely deployed. However, the WPS service provides low reliability in outdoor or suburban areas where APs are sparsely deployed (i.e., environments where positioning resources are relatively sparse), and exhibits wide differences in performance even in the same area depending on the distribution characteristics of APs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an integrated positioning method and apparatus which measures a user's location by integrating different positioning services.

An exemplary embodiment of the present invention provides an integrated positioning method which enables a positioning apparatus to measure a user's location. The integrated positioning method includes: acquiring a first estimated position obtained by a first positioning scheme and a first weight for the first estimated position; acquiring a second estimated position obtained by a second positioning scheme and a second weight for the second estimated position; correcting the first and second weights based on reference position information corresponding to the user location environment; and integrating the first and second estimated positions to produce a third estimated position by using the corrected first and second weights.

The correcting may include creating a list of position candidates by adjusting the first and second weights.

The creating of a list of position candidates may include: integrating the first and second estimated positions to estimate a first position candidate by using a first value of the first weight obtained before correction and a second value of the second weight obtained before correction; integrating the first estimated position and the second estimated position to estimate a second position candidate by increasing the first weight to a value higher than the first value and decreasing the second weight to a value lower than the second value; and integrating the first estimated position and the second estimated position to estimate a third position candidate by decreasing the first weight to a value lower than the first value and increasing the second weight to a value higher than the second value.

The correcting may further include: acquiring the reference position information; determining the position candidate most approximate to the reference position information, among the first to third position candidates; and correcting the first and second weights to correspond to the determined position candidates.

The reference position information may correspond to actual environment surrounding the user's location.

The reference position information may include at least one of position information about surrounding points of interest (POIs) acquired through surrounding perception, position information acquired by tag reading, position information acquired through map correction, and position information acquired by user input.

The acquiring of the first weight may include acquiring the first weight from a first provider who provides weight information for each position.

The first positioning scheme may be either a scheme for measuring an absolute position of a user or a scheme for measuring a relative position of a user.

The integrated positioning method may further include sending a value of the corrected first weight and a value of the corrected second weight to the first provider to update the weights.

Another exemplary embodiment of the present invention provides an integrated positioning method which enables a positioning apparatus to measure a user's location. The integrated positioning method includes: acquiring a plurality of first estimated positions by a plurality of positioning schemes; acquiring weights for the first estimated positions from a first provider who provides weight information for each position; and integrating the first estimated positions to produce a second estimated position by using the weights.

The weight information for each position may be calculated by comparing positioning results obtained by the positioning schemes with an actual position, in the process of building a database.

The plurality of positioning schemes may include the first positioning scheme and the second positioning scheme.

The building of a database may include: calculating, by the first provider, first reliability for a first positioning scheme by using a third estimated position corresponding to a first actual position and positioning accuracy for the third estimated position; calculating, by the first provider, a first weight for the first positioning scheme based on the first reliability; calculating, by the first provider, second reliability for a second positioning scheme by using a fourth estimated position corresponding to the first actual position and positioning accuracy for the third estimated position; and calculating, by the first provider, a second weight for the second positioning scheme based on the second reliability.

The third estimated position is measured by the first positioning scheme, and the fourth estimated position is measured by the second positioning scheme.

Yet another exemplary embodiment of the present invention provides an integrated positioning apparatus which measures a user's location. The integrated positioning apparatus includes: a positioning processor that acquires a plurality of first estimated positions by a plurality of positioning schemes and first weights for the first estimated positions; a corrector that corrects the first weights to generate second weights, based on user environment information; and an integration processor that integrates the first estimated positions to produce a second estimated position by using the second weights.

DETAILED DESCRIPTION OF THE EMBODIMENTS

Figure 1:
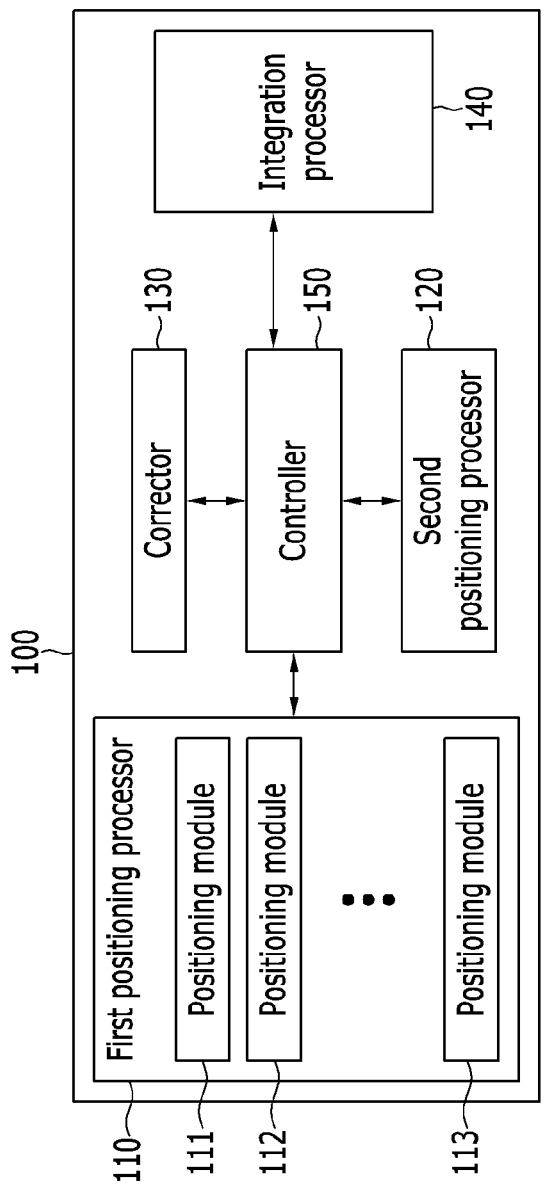
FIG. 1 is a view showing an integrated positioning apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may indicate a mobile terminal (MT), an advanced mobile station (AMS), high reliability mobile station (HR-MS), a subscriber station (SS), a portable subscriber station (PSS), an access terminal (AT), and user equipment (UE), and it may include entire or partial functions of the terminal, MT, MS, AMS, HR-MS, SS, PSS, AT, and UE.

In the specification, an AP (access point) may indicate a base station (BS), an advanced base station (ABS), a high reliability base station (HR-BS), a node B (NodeB), an evolved node B (eNodeB), a radio access station (RAS), a base transceiver station (BTS), a mobile multihop relay (MMR)-BS, a relay station (RS) serving as a base station, and a high reliability relay station (HR-RS) serving as a base station, and it may include entire or partial functions of the AP, BS, ABS, nodeB, eNodeB, RAS, BTS, MMR-BS, RS, and HR-RS.

An integrated positioning algorithm provides reliable and highly available positioning service by integrating positioning technologies with different service areas and different features. Specifically, the integrated positioning algorithm actively uses another positioning service with complementary positioning quality in a shadow area of one positioning service, or integrates positioning results obtained through different positioning services depending on the quality of each positioning service in a shadow area common to all the different positioning services. Through the integrated positioning algorithm, a user can be provided with a continuous and reliable positioning service even in an environment where any positioning service is not available.

Meanwhile, in a positioning system such as the GNSS system or WPS system, signal environment and distribution characteristics of available positioning resources that directly affect positioning performance vary greatly with the environment where the user is located. Due to this, the quality of the positioning service the user actually receives also varies greatly with the user location environment, and hence the positioning system may not guarantee a certain level of reliability or higher.

To provide a reliable integrated positioning service, the positioning system is able to provide a positioning result estimated through a positioning service and also a performance measurement index indicating the accuracy of the positioning result. The integrated positioning method according to the exemplary embodiment of the present invention allows for effective and reliable integration of positioning results based on a performance measurement index such as accuracy. For instance, the positioning system is able to provide the user's estimated position and a radius of error with a certain level of probabilistic reliability for this estimated position. The user can determine the positioning performance of the positioning system based on the radius of error. However, an estimated radius of error may differ significantly from an appropriate radius of error, depending on the user location environment. The integrated positioning method according to the exemplary embodiment of the present invention provides an effective and reliable integrated positioning service by adjusting a radius of error estimated through each positioning service using a weight based on the reliability of the radius of error, and using the adjusted radius of error. Referring to FIG. 1 to FIG. 4, an integrated positioning method and apparatus according to an exemplary embodiment of the present invention will be described in detail.

FIG. 1 is a view showing an integrated positioning apparatus 100 according to an exemplary embodiment of the present invention.

The integrated positioning apparatus 100 may be a portable terminal for a personal user. When the user is served with a positioning service using the integrated positioning apparatus 100, the integrated positioning apparatus 100 estimates the user's location and presents it through at least one of an absolute positioning service, a relative positioning service, and a positioning information acquisition service. Specifically, the integrated positioning apparatus 100 includes a first positioning processor 110, a second positioning processor 120, a corrector 130, an integration processor 140, and a controller 150.

The first positioning processor 110 performs positioning using the absolute positioning service (or an absolute positioning scheme). In the absolute positioning scheme, the absolute position of the user is measured by using positioning resources like GNSS, WPS, Cell-ID, etc. Specifically, the first positioning processor 110 may include at least one positioning module 111 to 113. Each positioning module 111 to 113 carries out its own absolute positioning scheme.

The second positioning processor 120 performs positioning using the relative positioning service (or a relative positioning scheme). In the relative positioning scheme, if the user moves, the amount of change in the relative position of the user is measured using a variety of navigation sensors, and the relative position of the user is measured using the measured amount of change.

The corrector 130 acquires positioning information using the positioning information acquisition service (scheme), and performs a correction operation using the acquired positioning information. In the positioning information acquisition scheme, positioning information is acquired through positioning resource detection such as surrounding POI (points of interest) detection or tag detection, through map correction, or through user input. Specifically, the corrector 130 is able to correct positioning weights by using the acquired positioning information.

The integration processor 140 integrates positioning results, obtained by at least one of the first and second positioning processors 110 and 120, to produce a single positioning result by using positioning weights.

The controller 150 controls the first positioning processor 110, second positioning processor 120, corrector 130, and integration processor 140.

When the integrated positioning apparatus 100 estimates the user's location and presents it, an individual positioning device (hereinafter, 'absolute positioning device'; e.g., each of the positioning modules 111 to 113 of the first positioning processor 110) using the absolute positioning scheme calculates individual positioning results by using positioning resources for their own positioning service. Then, the absolute positioning device can analyze the positioning resources and their characteristics to give accuracy to the calculated positioning results. The absolute positioning device may be a device that uses a positioning service provided by an external positioning device such as a Google positioning server. For a positioning service using GPS or WPS, for example, the absolute positioning device provides, along with an estimated position, probabilistic radius information indicating how accurate a positioning result obtained through this positioning service is (e.g., for Android's position information service, a radius of error with probabilistic reliability of 68% with respect to the coordinates of an estimated position). Through the probabilistic radius information, the user determines the accuracy of the positioning result. That is, the accuracy of a positioning result is calculated in reverse order to the radius of error. The radios of error may be calculated in accordance with positioning information input into a positioning algorithm at a point in time of positioning. After the passage of a certain period of time after the point in time of positioning, the radius of error for the positioning result can be estimated by taking into account the user's behavior characteristics. That is, when the absolute positioning device estimates the user's location at a second point in time after the passage of a certain period of time from a first point in time by using the position and radius of error estimated at the first point in time, a radius of error for the position estimated at the second point in time can be calculated by applying a statistical estimate of how far the user would move per unit time to the radius of error for the first point in time. For example, provided that the radius of error for position $P_0$ measured at the first point in time is 0 and the user moves at 1 m/s, the user's estimated position at the second point in time after three seconds from the first point in time is $P_0$ and the radius of error for the second point in time is 3.

An individual positioning device (hereinafter, 'relative positioning device') using the relative positioning scheme uses a device such as a personal navigation sensor. The relative positioning device may be the second positioning processor 120. Specifically, in a case where a positioning service provided by the relative positioning device is a PDR (Pedestrian Dead Reckoning) positioning service, the absolute positioning device determines initial position by using an estimated position (coordinates) obtained by the absolute positioning scheme, a position obtained by the positioning information acquisition scheme, or a position obtained by user input or the like. Then, the relative positioning device measures the relative distance of movement of the user by measuring the direction of movement of the user. Next, the relative positioning device estimates the user's final location by taking into account the measured amount of change in relative position. The relative positioning device estimates the rate of errors increasing with movement distance or movement pattern such as rotation, calculates the accuracy of the final estimated position using the estimated rate of error increase, and provides the calculated accuracy.

The integrated positioning apparatus 100 uses information acquired by the positioning information acquisition scheme for the sake of the positioning service. Specifically, when the user is using a service such as an augmented reality service, they may use position information and accuracy of neighboring POIs that can be acquired through peripheral perception, for the sake of the positioning service. Alternatively, the integrated positioning apparatus 100 may use position information and accuracy of a tag that can be acquired through a tactile service such as tags, for the sake of the positioning service. Alternatively, the integrated positioning apparatus 100 may use position information and accuracy of related positioning resources that can be acquired through map correction or user input, for the sake of the positioning service.

Provided that the integrated positioning apparatus 100 is able to use positioning information acquired through POI detection, tag detection, user input, etc. or a certain level of absolute positioning information provided from the absolute positioning device such as GNSS, WPS, etc., it can determine position information included in available positioning information as the start point and detect the user's movement by using the relative positioning device (e.g., the second positioning processor 120). Then, the integrated positioning apparatus 100 estimates the user's position using the detected value, and at the same time calculates the accuracy of the estimated position based on the movement information. The integrated positioning apparatus 100 may correct the current estimated position based on the acquired position information and accuracy during the provision of the positioning service, if it is able to correct an estimated position using information acquired through a function such as POI detection, tag detection, map correction, or user input. As such, the integrated positioning apparatus 100 can provide a reliable positioning service.

Figure 2:
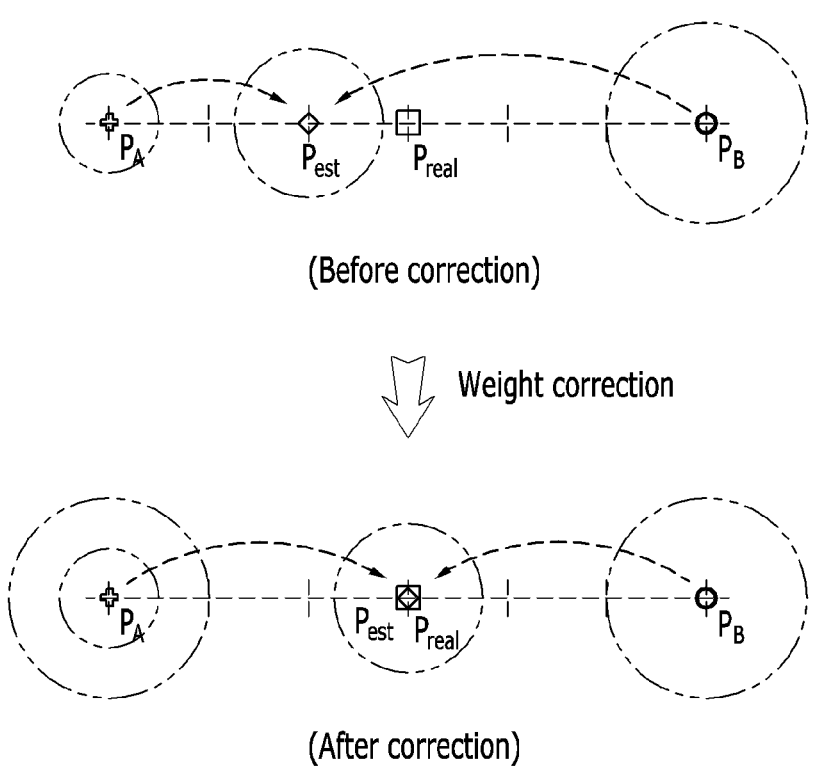
FIG. 2 is a view showing the concept of an integrated positioning method according to an exemplary embodiment of the present invention.

FIG. 2 is a view showing the concept of an integrated positioning method according to an exemplary embodiment of the present invention. The integrated positioning apparatus 100 corrects positioning accuracy based on information about the user location environment, and calculates a more accurate estimated position by using the corrected positioning accuracy. For ease of explanation, FIG. 2 illustrates that the user is using two different two-dimensional positioning services (positioning service A and positioning service B) at the same time.

The integrated positioning apparatus 100 obtains positioning result $L_A$ through the positioning service A and positioning result $L_B$ through the positioning service B. The positioning result $L_A$ includes position information $P_A$ and radius $R_A$ of error, and the positioning result $L_B$ includes position information $P_B$ and radius $R_B$ of error. That is, $L_A$ can be expressed by ($P_A$, $R_A$), and $L_B$ can be expressed by ($P_B$, $R_B$). The positioning accuracy $C_A$ of the positioning result $L_A$ can be calculated by $1/R_A$, and the positioning accuracy $C_B$ of the positioning result $L_B$ can be calculated by $1/R_B$. For example, provided that the real position $P_{real}$ at the time of measurement is 0, $L_A$ is (−3, 0.5), and $L_B$ is (3, 1), it can be concluded, based only upon the position information $P_A$ and $P_B$, that the two positioning services A and B are equal in accuracy. However, with both the position information $P_A$ and $P_B$ and the radiuses $R_A$ and $R_B$ taken into consideration, it can be concluded that $L_B$ is better than $L_A$ in terms of reliability index that indicates how reliable positioning accuracy is. If the integrated positioning apparatus 100 integrates the positioning results $L_A$ and $L_B$ by using the initial positioning weights, errors in position information $P_{est}$ estimated by integration increase due to a significant error in the accuracy of the positioning result error $L_A$. The integrated positioning apparatus 100 may use an average integration algorithm, one of the integrated positioning algorithms, in order to integrate the positioning results $L_A$ and $L_B$. For example, provided that the positioning weight for $P_A$ is $W_A$ and the positioning weight for $P_B$ is $W_B$, the position information $P_{est}$ generated by the average integration algorithm is given by the following Equation 1.

$$P_{est}=P_A*\{W_A*C_A/(W_A*C_A+W_B*C_B)\}+P_B*\{W_B*C_B/(W_A*C_A+W_B*C_B)\} \quad \text{(Equation 1)}$$

The integrated positioning apparatus 100 can reduce errors in the integrated positioning result $P_{est}$ by properly correcting the positioning weights $W_A$ and $W_B$. Specifically, the integrated positioning apparatus 100 can adjust the positioning weights $W_A$ and $W_B$ to default value (e.g., 1.0)±α, based on user preference or information about the user location environment. If the positioning weights $W_A$ and $W_B$ are corrected by taking into consideration the reliability of positioning accuracy $C_A$ and $C_B$, the positioning results $L_A$ and $L_B$ each include an appropriate position coordinate value ($P_A$ is −3 and $P_B$ is 3) and appropriate accuracy (radius $R_A$ of error is changed from 0.5 to 1). As such, the integrated positioning apparatus 100 can provide a positioning service with high reliability.

The positioning weights $W_A$ and $W_B$ for the positioning results $L_A$ and $L_B$ can be obtained or estimated through at least either by a method of provision by service provider or by a method of estimation using a positioning weight estimation module.

Figure 3:
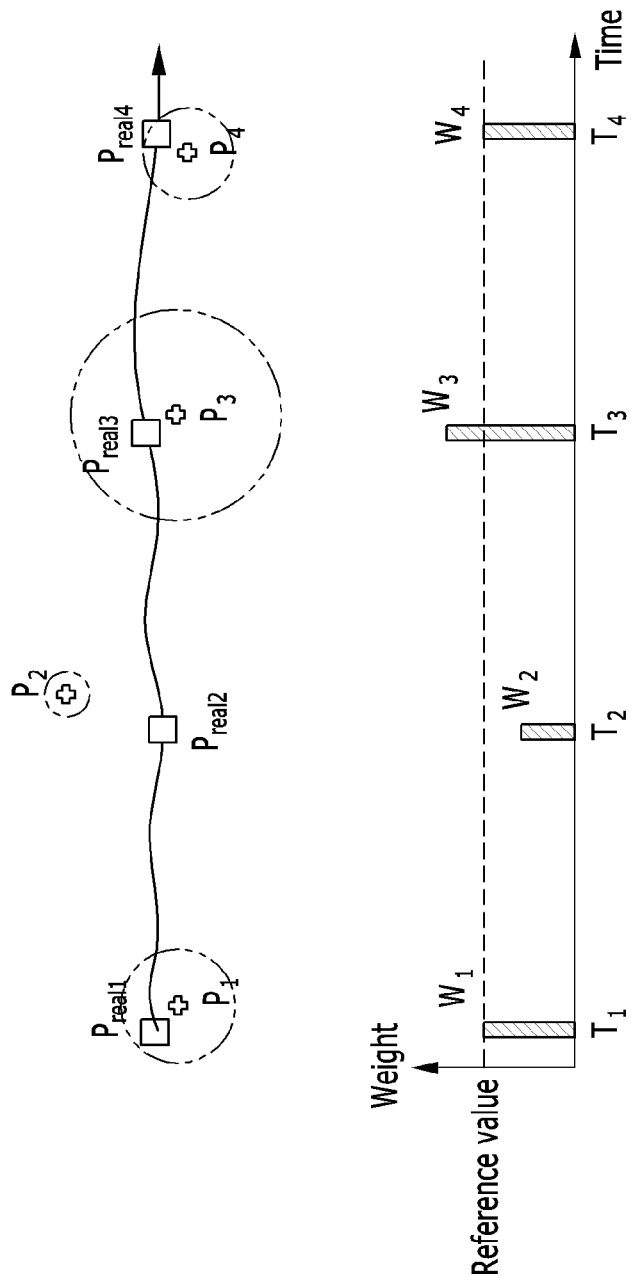
FIG. 3 is a view showing a method for a service provider to build up positioning weight information according to an exemplary embodiment of the present invention.

FIG. 3 is a view showing a method for a service provider to build up positioning weight information according to an exemplary embodiment of the present invention.

Specifically, the service provider builds a database of positioning weight information for each position in an individual positioning service, and provides the positioning weight information to the integrated positioning apparatus 100. If the individual positioning device is a WPS positioning service, for example, the service provider collects information about WiFi around the first area (region) targeted for the service and makes a database of it. That is, the service provider collects information about WiFi APs around each reference position of measurement in the initial process of collecting positioning resource information. Afterwards, a positioning terminal sends the service provider information about nearby WiFi that can be collected at each reference position. The service provider calculates estimated position with respect to a reference position and its accuracy through a WPS positioning algorithm by using the WiFi information received from the positioning terminal. Then, the service provider verifies (calculates) the reliability of accuracy of the estimated position by comparing the estimated position with the reference position, and calculates positioning weight for the estimated position with respect to the reference position (or positioning weight for the reference position) based on the reliability and makes a database of them. Next, the service provider provides information (positioning weight information, positioning result, etc.) corresponding to a request from the integrated positioning apparatus 100.

For example, the service provider determines whether position information $P_1$ and positioning accuracy $C_1$ (=$1/R_1$) estimated based on WiFi information received at time $T_1$ conform to the reference position $P_{real1}$. As the real position $P_{real1}$ at time $T_1$ is close to $P_1$ and within radius $R_1$ of error, the service provider determines that the reliability of positioning accuracy in the user location environment at time $T_1$ is at a satisfactory level, and sets the positioning weight $W_1$ for the positioning result obtained at time $T_1$ as a reference value. Then, the service provider determines whether position information $P_2$ and positioning accuracy $C_2$ (=$1/R_2$) estimated at time $T_2$ conform to reference position $P_{real2}$. While the value of positioning accuracy $C_2$ is high, the difference between position $P_2$ and the real position $P_{real2}$ is very large. Thus, the service provider determines that the reliability of positioning accuracy in the user location environment at time $T_2$ is lower than expected, and sets the positioning weight $W_2$ for the positioning result obtained at time $T_2$ to be lower than the reference value. Then, the service provider determines whether position information $P_3$ and positioning accuracy $C_3$ (=$1/R_3$) estimated at time $T_3$ conform to the reference position $P_{real3}$. While the value of positioning accuracy $C_3$ is very low, the difference between position $P_3$ and the real position $P_{real3}$ is very small. Thus, the service provider determines that the reliability of positioning accuracy in the user location environment at time $T_3$ is higher than expected, and sets the positioning weight $W_3$ for the positioning result obtained at time $T_3$ to be higher than the reference value. Then, the service provider determines whether position information $P_4$ and positioning accuracy $C_4$ (=$1/R_4$) estimated at time $T_4$ conform to the reference position $P_{real4}$. While the value of positioning accuracy $C_4$ is very low, the difference between position $P_4$ and real position $P_{real4}$ is very small. Thus, the service provider determines that the reliability of positioning accuracy in the user location environment at time $T_4$ is higher than expected, and sets the positioning weight $W_4$ for the positioning result obtained at time $T_4$ to be higher than the reference value.

Accordingly, the service provider actually calculates reliability or a positioning weight for each reference position for an individual positioning service in the process of building positioning information about reference positions $P_{real1}$ to $P_{real4}$. Then, the service provider provides the reliability or the positioning weight to the integrated positioning apparatus 100. As such, the integrated positioning apparatus 100 is able to meet expectations for service accuracy and provide highly reliable service.

Figure 4:
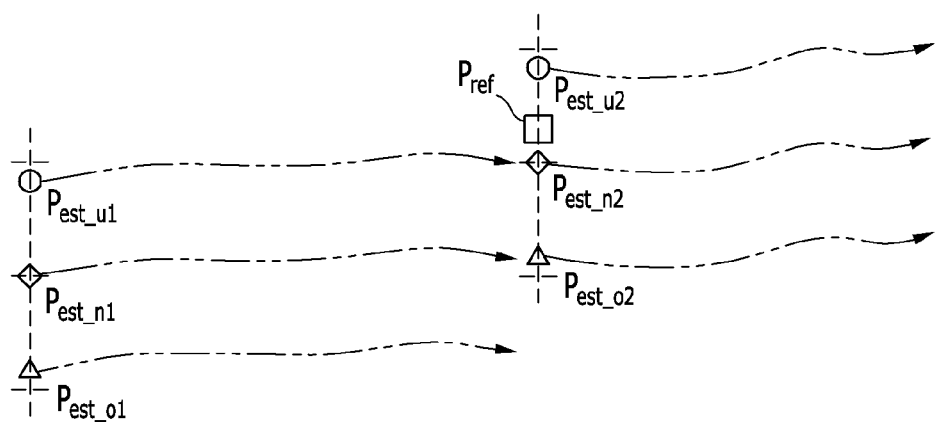
FIG. 4 is a view showing a method of estimating a positioning weight according to an exemplary embodiment of the present invention.

FIG. 4 is a view showing a method of estimating a positioning weight according to an exemplary embodiment of the present invention. Specifically, FIG. 4 illustrates that the integrated positioning apparatus 100 estimates a positioning weight using a weight estimation module. The weight estimation module may be included in the corrector 130.

The integrated positioning apparatus 100 calculates the utilization (or positioning weight) of each positioning result based on the reliability of each positioning service, estimates the user's location through an integrated positioning algorithm based upon the utilization of each positioning result, and presents the estimated position to the user.

If the integrated positioning apparatus 100 is able to use the method of provision by the service provider, positioning weight information received from the service provider can be used as the initial value of a positioning weight. Otherwise, a preset reference value is used as the initial value of the positioning weight.

Then, the integrated positioning apparatus 100 creates a list of candidates for virtually integrated positions first, in order to correct the positioning weight. For ease of explanation, it is assumed that integrated positioning apparatus 100 uses two different positioning services (positioning service A and positioning service B). Specifically, the integrated positioning apparatus 100 sets the positioning weight $W_A$ for positioning result $L_A$ obtained by the positioning service A as a first initial value and the positioning weight $W_B$ for positioning result $L_B$ obtained by the positioning service B as a second initial value, and then integrates the positioning results $L_A$ and $L_B$ to produce a first position candidate $P_{est\_n1}$ through an integrated positioning algorithm. Then, the integrated positioning apparatus 100 sets $W_A$ to a first value, which is higher than the first initial value, and $W_B$ to a second value, which is lower than the second initial value, and then integrates the positioning results $L_A$ and $L_B$ to produce a second position candidate $P_{est\_o1}$ through the integrated positioning algorithm. Next, the integrated positioning apparatus 100 sets $W_A$ to a third value, which is lower than the first initial value, and $W_B$ to a fourth value, which is higher than the second initial value, and then integrates the positioning results $L_A$ and $L_B$ to produce a third position candidate $P_{est\_u1}$ through the integrated positioning algorithm. The list of candidates for virtually integrated positions includes first to third position candidates $P_{est\_n1}$, $P_{est\_o1}$, and $P_{est\_u1}$.

Afterwards, the integrated positioning apparatus 100 provides integrated positioning service by using the initial values (first and second initial values) of the positioning weights $W_A$ and $W_B$.

The integrated positioning apparatus 100 acquires reliable positioning information through a positioning information acquisition scheme during the provision of integrated positioning service. The reliable positioning information (hereinafter, 'auxiliary positioning information') is positioning information acquired through map correction, POI detection, tag detection, user input, correction information, etc., which is substantial information associated with the user's current location (information about the actual environment of the current location). Upon acquiring auxiliary positioning information, the integrated positioning apparatus 100 compares the position candidates $P_{est\_n1}$, $P_{est\_o1}$, and $P_{est\_u1}$ of the list of candidates for virtually integrated positions with position information $P_{ref}$ corresponding to the auxiliary positioning information in terms of reliability at the time of acquisition of the auxiliary positioning information. Specifically, the integrated positioning apparatus 100 determines the position candidate most approximate to the position information $P_{ref}$ or the most appropriate position candidate, among the position candidates $P_{est\_n1}$, $P_{est\_o1}$, and $P_{est\_u1}$. As shown in FIG. 4, since the third position candidate $P_{est\_u1}$ is most approximate to the position information $P_{ref}$, the integrated positioning apparatus 100 resets the positioning weights $W_A$ and $W_B$ to the values used to estimate the third position candidate $P_{est\_u1}$. That is, the integrated positioning apparatus 100 resets $W_A$ to the third value and $W_B$ to the fourth value.

The integrated positioning apparatus 100 estimates a list of candidates for virtually integrated positions again, based on the corrected values (third and fourth values). Specifically, using the initial values of $W_A$ and $W_B$, the integrated positioning apparatus 100 integrates the positioning results $L_A$ and $L_B$ into a first position candidate $P_{est\_n2}$ through the integrated positioning algorithm. Then, the integrated positioning apparatus 100 sets $W_A$ to a fifth value, which is higher than the third value, and $W_B$ to a sixth value, which is lower than the fourth value, and then integrates the positioning results $L_A$ and $L_B$ to produce a second position candidate $P_{est\_o2}$ through the integrated positioning algorithm. Subsequently, the integrated positioning apparatus 100 sets $W_A$ to a seventh value, which is lower than the third value, and $W_B$ to an eighth value, which is higher than the fourth value, and then integrates the positioning results $L_A$ and $L_B$ to produce a third position candidate $P_{est\_u2}$ through the integrated positioning algorithm.

The integrated positioning apparatus 100 then provides the integrated positioning service by using the corrected values (third and fourth values) of the positioning weights $W_A$ and $W_B$.

The integrated positioning apparatus 100 can send the service provider correction information (e.g., position information at the time of correction, corrected values of positioning weights, etc.) for the positioning weights $W_A$ and $W_B$. The service provider can update a database of positioning weight information by referring to the received correction information. The positioning weight information service updated by the service provider can be used for a positioning service that is provided to users placed in the same environment as a corresponding position.

Figure 5:
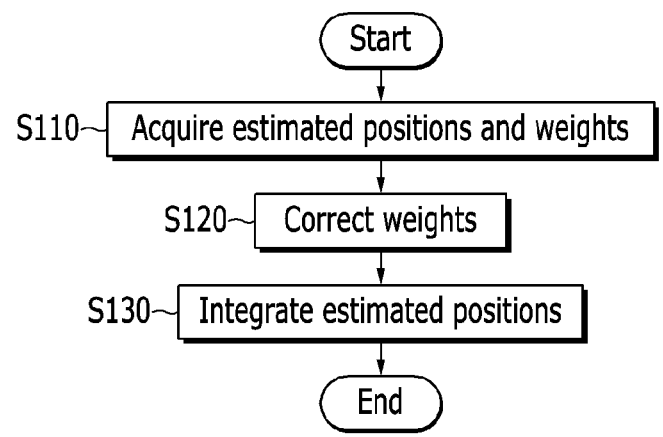
FIG. 5 is a flowchart showing a process for an integrated positioning apparatus to measure a user's location.

FIG. 5 is a flowchart showing a process for an integrated positioning apparatus 100 to measure a user's location.

The integrated positioning apparatus 100 acquires a plurality of estimated positions and positioning weights for these estimated positions, through a plurality of different positioning schemes (S110).

The integrated positioning apparatus 100 corrects the positioning weights acquired in S110 (S120). Specifically, the integrated positioning apparatus 100 is able to correct positioning weights based on the user location environment.

The integrated positioning apparatus 100 integrates the estimated positions acquired in S110 to produce a single estimated position by using the corrected positioning weights (S130).

The integrated positioning apparatus 100 presents the estimated position obtained in S130 to the user.

In the present invention, a plurality of different positioning services are used in an integrated way, and the rate of utilization of positioning results obtained by these positioning services is adaptively adjusted. Specifically, in the present invention, positioning weights for different positioning services can be adjusted depending on the user's location and environment. Therefore, according to an embodiment of the present invention, reliability of the integrated positioning service can be improved by integrating positioning results based on adaptive reliability.

Moreover, according to an embodiment of the present invention, the reliability of positioning for the integrated positioning service can be verified, and positioning weights can be corrected based on auxiliary positioning information. As such, adaptive and reliable positioning results can be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An integrated positioning method which enables a positioning apparatus to measure a position of a user, the method comprising:
    acquiring a first estimated position obtained by a first positioning scheme and a first weight for the first estimated position;
    acquiring a second estimated position obtained by a second positioning scheme and a second weight for the second estimated position;
    correcting the first and second weights based on reference position information corresponding to position environment of the user; and
    integrating the first and second estimated positions to produce a third estimated position by using the corrected first and second weights,
    wherein the correcting comprises:
    integrating the first and second estimated positions to estimate a first position candidate by using a first value of the first weight obtained before correction and a second value of the second weight obtained before correction; and
    integrating the first estimated position and the second estimated position to estimate a second position candidate by increasing the first weight to a value higher than the first value and decreasing the second weight to a value lower than the second value.

2. The method of claim 1, wherein
    the correcting further comprises:
    integrating the first estimated position and the second estimated position to estimate a third position candidate by decreasing the first weight to a value lower than the first value and increasing the second weight to a value higher than the second value.

3. The method of claim 2, wherein the correcting further comprises:
    acquiring the reference position information;
    determining the position candidate most approximate to the reference position information, among the first to third position candidates; and
    correcting the first and second weights to correspond to the determined position candidate.

4. The method of claim 3, wherein the reference position information corresponds to actual environment surrounding the position of the user.

5. The method of claim 3, wherein the reference position information comprises at least one of position information about surrounding points of interest (POIs) acquired through surrounding perception, position information acquired by tag reading, position information acquired through map correction, and position information acquired by user input.

6. The method of claim 1, wherein the acquiring of the first weight comprises acquiring the first weight from a first provider who provides weight information for each position.

7. The method of claim 6, further comprising sending a value of the corrected first weight and a value of the corrected second weight to the first provider to update the weights.

8. The method of claim 1, wherein the first positioning scheme is either a scheme for measuring an absolute position of a user or a scheme for measuring a relative position of a user.

9. An integrated positioning method which enables a positioning apparatus to measure a position of a user, the method comprising:
    acquiring a plurality of first estimated positions by a plurality of positioning schemes;
    acquiring weights for the first estimated positions from a first provider who provides weight information for each position; and
    integrating the first estimated positions to produce a second estimated position by using the weights;
    wherein the weight information for each position is calculated by comparing positioning results obtained by the positioning schemes with an actual position, in the process of building a database,
    wherein the building of a database comprises:
    calculating, by the first provider, first reliability for a first positioning scheme of the plurality of positioning schemes by using a third estimated position corresponding to a first actual position and positioning accuracy for the third estimated position; and
    calculating, by the first provider, a first weight for the first positioning scheme based on the first reliability.

10. The method of claim 9, wherein
    the building of a database further comprises:
    calculating, by the first provider, second reliability for a second positioning scheme of the plurality of positioning schemes by using a fourth estimated position corresponding to the first actual position and positioning accuracy for the third fourth estimated position; and
    calculating, by the first provider, a second weight for the second positioning scheme based on the second reliability,
    wherein the third estimated position is measured by the first positioning scheme and the fourth estimated position is measured by the second positioning scheme.

11. The method of claim 9, wherein the first positioning scheme is a user positioning method using either APs (access points), a navigation satellite system, or an amount of change in the relative position of the user measured by navigation sensors.

12. The method of claim 9, wherein the producing of a second estimated position comprises correcting the weights for the first estimated positions based on environment of the user.

13. An integrated positioning apparatus which measures a position of a user, comprising:
- a positioning processor that acquires a plurality of first estimated positions by a plurality of positioning schemes and first weights for the first estimated positions;
- a corrector that corrects the first weights to generate second weights, based on position environment information of the user; and
- an integration processor that integrates the first estimated positions to produce a second estimated position by using the second weights,
- wherein the first weights comprise a third weight corresponding to a first positioning scheme of the plurality of positioning schemes and a fourth weight corresponding to a second positioning scheme of the plurality of positioning schemes, and
- wherein the corrector integrates the first estimated positions to estimate a first position candidate by using a first value of the third weight and a second value of the fourth weight, and integrates the first estimated positions to estimate a second position candidate by increasing the third weight to a value higher than the first value and decreasing the fourth weight to a value lower than the second value.

14. The apparatus of claim 13, wherein
the corrector integrates the first estimated positions to estimate a third position candidate by decreasing the third weight to a value lower than the first value and increasing the fourth weight to a value higher than the second value.

15. The apparatus of claim 14, wherein the corrector acquires reference position information corresponding to the position environment information of the user, determines the position candidate most approximate to the reference position information, among the first to third position candidates, and corrects the third weight and the fourth weight to correspond to the determined position candidate.

16. The apparatus of claim 15, wherein the reference position information comprises at least one of position information about surrounding points of interest (POIs) acquired through surrounding perception, position information acquired by tag reading, position information acquired through map correction, and position information acquired by user input.

17. The apparatus of claim 13, wherein the positioning processor acquires the first weights from a first provider who provides weight information for each position.

* * * * *